R. McFARLANE.
SCALE.
APPLICATION FILED OCT. 17, 1910.
1,072,019.
Patented Sept. 2, 1913.
2 SHEETS—SHEET 1.
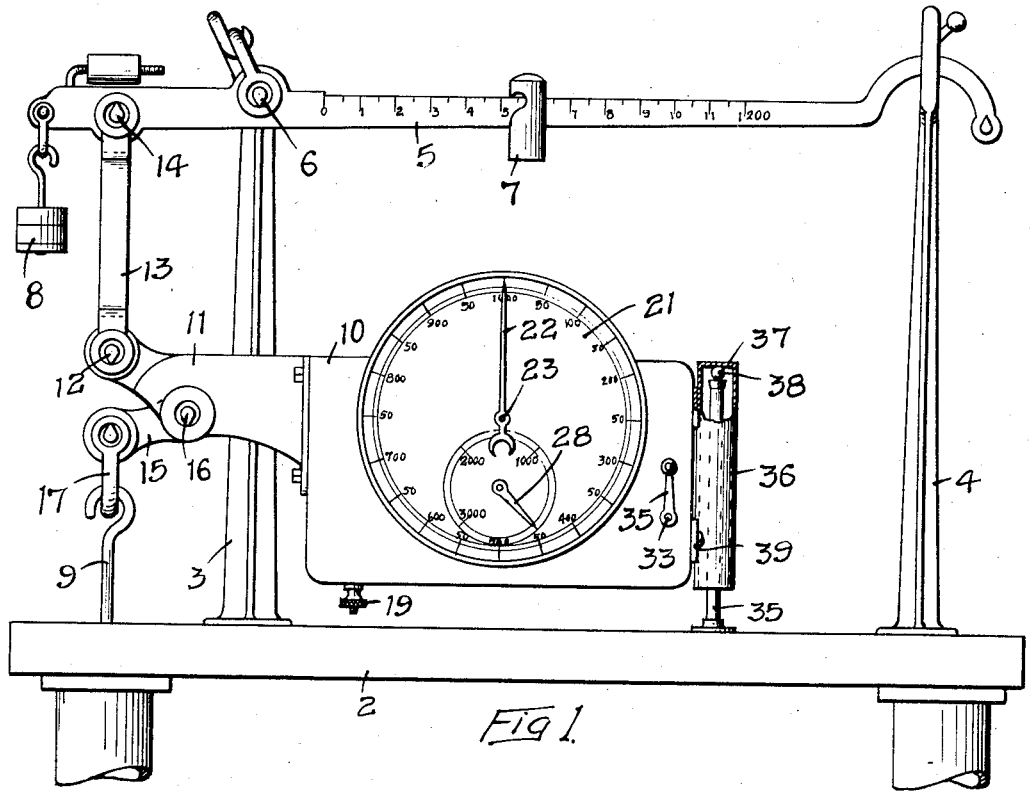
Fig 1.
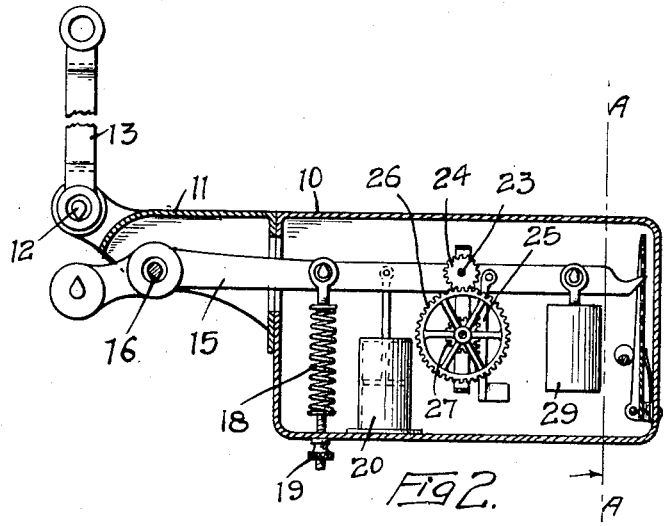
Fig 2.
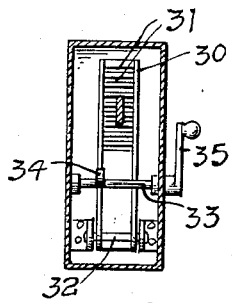
Fig 3. A-A
WITNESSES
INVENTOR
ROBERT McFARLANE
BY Paul & Paul
ATTORNEYS R. McFARLANE.
SCALE.
APPLICATION FILED OCT. 17, 1910.
1,072,019.
Patented Sept. 2, 1913.
2 SHEETS—SHEET 2.
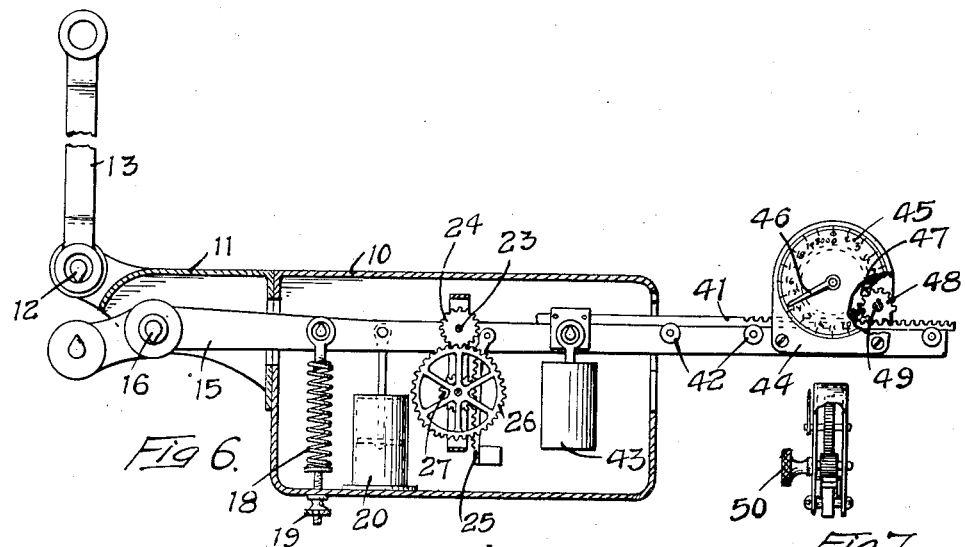
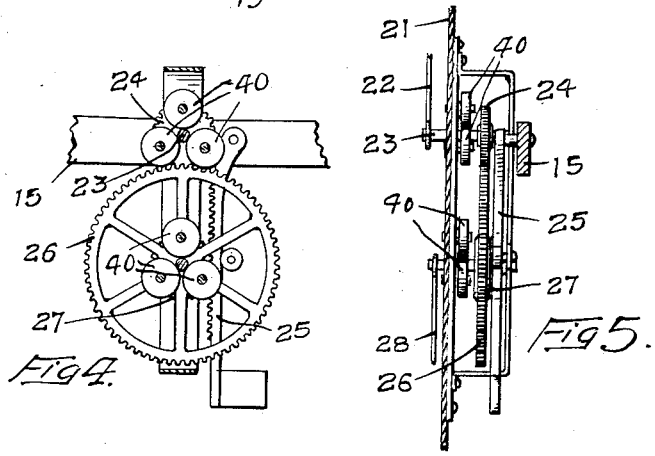
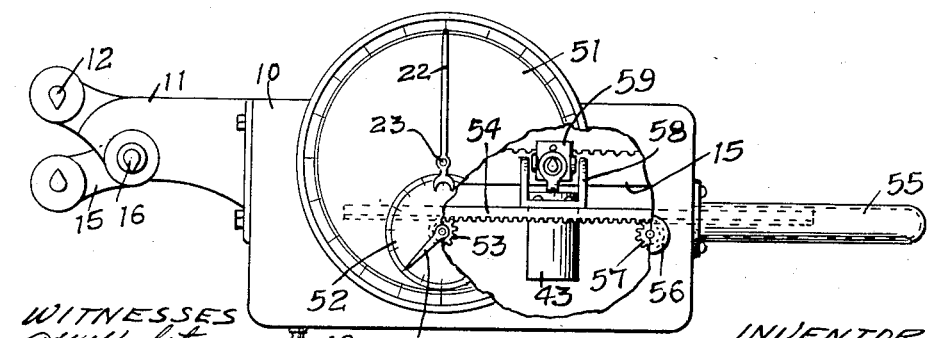
WITNESSES
INVENTOR
ROBERT McFARLANE
BY
Paul & Paul
ATTORNEYS

UNITED STATES PATENT OFFICE.

ROBERT McFARLANE, OF MINNEAPOLIS, MINNESOTA, ASSIGNOR, BY DIRECT AND MESNE ASSIGNMENTS, TO McFARLANE MANUFACTURING COMPANY, OF CHICAGO, ILLINOIS, A CORPORATION OF ILLINOIS.

SCALE.

1,072,019. Specification of Letters Patent. Patented Sept. 2, 1913.

Application filed October 17, 1910. Serial No. 587,547.

*To all whom it may concern:*

Be it known that I, ROBERT MCFARLANE, of Minneapolis, Hennepin county, Minnesota, have invented certain new and useful Improvements in Scales, of which the following is a specification.

My invention relates to weighing scales and the object of the invention is to improve the scale shown and described in my pending application for Letters Patent of the United States, filed April 29, 1910, Serial No. 558,483.

My invention consists in an improved means for connecting the auxiliary beam with the main beam of the scale.

Further the invention consists in certain devices or attachments in connection with the auxiliary beam to insure the uniform and regular movement of the beam.

In the accompanying drawings forming part of this specification, Figure 1 is a front elevation of a portion of a weighing scale with my invention applied thereto, Fig. 2 is a detail view of the auxiliary beam, showing its casing in section, Fig. 3 is a sectional view on the line a—a of Fig. 2, Figs. 4 and 5 are detail views of the mechanism in connection with the indicating hand of the dial, Fig. 6 is a detail sectional view of the auxiliary beam and its connections, showing a modified construction, Fig. 7 is an end view of Fig. 6, Fig. 8 is a detail view illustrating a modified means for operating the balance weight.

In the drawing, 2 represents the upper portion of a scale of the platform type, the lower portion being omitted, as it forms no part of my present invention.

3 and 4 are standards mounted on the part 2 and 5 is a scale beam pivoted at 6 in the usual way on the standards 3.

7 is a sliding beam weight and 8 are balance weights suspended on the beam 5 near the pivots thereof.

9 is a rod leading to the platform levers, not shown.

10 is a casing having a bracket 11 that has bearings 12 for the lower end of a link 13 that has a bearing 14 at its upper end on the beam 5 between the pivots 6 of said beam and the balance weight 8. This casing and bracket form, in effect, a lever casing suspended from the main scale beam. An auxiliary beam 15 is pivoted at 16 on the bracket 11 and the end of the beam 13 has a link 17 pivotally connecting said beam with the rod 9. The beam 15 is thus free to move independently of the main scale beam 5 and the load is transmitted through the rod 9, the auxiliary beam and the link 13. A spring 18 is attached to the beam 15 and has an adjustable connection at 19 in the casing 10 by means of which the tension of the spring can be increased or decreased as desired. This spring is put under tension by the upward movement of the auxiliary beam when the load is placed on the platfrom. The dash-pot device 20 connected with the auxiliary beam regulates the stroke of the beam and insures a regular, uniform movement thereof. A dial 21 is mounted on the casing 10 and is suitably graduated and an indicator hand 22, carried by a spindle 23, is adapted to move over said graduations. A pinion 24 is mounted on said spindle and a gear 26 meshes with the pinion 24 and has a pinion 27 which meshes with a rack bar 25 that is attached to the beam 15 and moves vertically therewith. The gear 27 carries an indicator hand 28 which travels over a second circle of graduations on the dial, representing thousands of pounds. A weight 29 is suspended on the free end of the beam 15 and has the function of a balance weight to aid the operator in bringing the scale to a balance.

To lock the auxiliary scale beam against movement, I prefer to provide a bar 30 having a series of slots 31 therein adapted to receive the end of the beam 15 to lock it against oscillation, the bar 30 being pivoted at 32 and having a limited swinging movement toward and from the end of the beam. Any suitable means may be provided for throwing the bar out of contact with the beam, but I prefer to provide a shaft 33 carrying an eccentric 34 which engages the bar and is operated by a lever 35. When the bar 30 is in a vertical, operative position the beam will be securely locked against movement in either direction. I also provide a standard 35 mounted on the part 2 and fitting loosely within a tube 36 which has a closed upper end 37 and contains a ball bearing 38. The tube 36 is carried by brackets 39 secured to the casing 10. The weight of the casing is thus supported on the standard 35 through the ball bearing 38, there being sufficient play between the tube 36 and the standard to allow the ball to roll around and adjust itself to the different positions of the casing. I prefer to provide roller bearings 40 for the spindles of the indicator hands, as indicated in Fig. 4.

In Fig. 6 I have shown a modified construction, which consists in providing a rack bar 41 on the auxiliary beam, slidable lengthwise thereof on anti-friction rollers 42 and carrying a balance weight 43. A plate 44 is secured on the outer end of the auxiliary beam, which projects through the end of the casing and is provided with a dial 45, graduated to represent fractions of thousands. The indicator hand 46 for said dial has a spindle carrying a gear 47 which meshes with a gear 48 mounted on a stud 49 which has bearings in the plate 44. The gear 48 meshes with the rack bar 41 and also with the gear 47. A finger grip 50 is mounted on the pin 49 and by revolving the gear 48 the rack bar 41 will be reciprocated lengthwise of the scale beam and the weight 43 moved back and forth on the beam until the scale balances.

The form of scale illustrated in Fig. 6 is designed for use as a track scale, the large dial being graduated in hundredths of thousands to adapt the scale for weighing freight cars where the scale of Fig. 1, graduated to three thousand pounds, would be inadequate. The hundredths of thousands would be indicated by the main dial of Fig. 6, while the auxiliary dial 45 would indicate the fractions of thousands and would have the same function in the scale as the large dial of Fig. 1.

In Fig. 8 another modification is shown, which consists in a large dial 51 and a smaller dial 52 having indicating hands corresponding to those in Fig. 1, and the pinion 53 of the indicator 52 meshing with a rack bar 54 which slides horizontally within the casing and within a hollow projecting stud 55. A finger grip 56 has a spindle carrying a pinion 57 which meshes with the teeth of the rack bar. A yoke 58 is mounted on the rack bar and engages a slide 59 carried by the auxiliary beam and supporting the weight 43. The movement of the rack bar and yoke back and forth slides the weight on the beam until the scale is brought to a balance. The correct weight can be then ascertained by a glance at the dial.

I claim as my invention:—

1. The combination, with a scale beam and a scale platform connection, of a casing having a pivotal connection with said beam, an auxiliary beam pivotally supported in said casing and attached at one end to said scale platform connection, a spring connected with said auxiliary beam within said casing, a balance weight carried by said auxiliary beam within said casing, a dial mounted on said casing, and an indicator hand arranged to move over the graduations of said dial and operatively connected with said auxiliary beam.

2. A scale comprising a scale beam and platform connection, a casing having a bracket mounted thereon, a link pivotally connecting said bracket with said scale beam, an auxiliary beam projecting into said casing and pivoted on said bracket and attached to said scale platform connection, a spring arranged within said casing and attached thereto and to said auxiliary beam, a balance weight carried by said auxiliary beam, a dial mounted on said casing, an indicator hand operatively connected with said auxiliary beam and movable over the graduations of said dial, and mechanism for moving said balance weight.

3. A scale comprising a scale beam and platform connection, a casing having a pivotal connection with said beam, an auxiliary beam projecting into said casing and pivotally supported thereon and attached at one end to said platform connection, a spring connected with said auxiliary beam, a balance weight mounted on said auxiliary beam, mechanism for adjusting said balance weight, a graduated dial, and an indicator hand operatively connected with said beam and adapted to move over the graduations of said dial.

4. A scale comprising a scale beam and platform connection, an auxiliary beam connected to said scale beam and attached at one end to said platform connection, a spring arranged to resist movement of said beam, a balance weight mounted on said auxiliary beam, a graduated dial and an indicator hand operatively connected with said auxiliary beam and adapted to move over the graduations of said dial, a secondary dial graduated to represent fractions of the graduations of the main dial, an indicator hand for said secondary dial, a finger grip, and means operatively connecting said finger grip with said secondary dial indicator hand and with said balance weight, for the purpose specified.

5. A scale comprising a scale beam and platform connection, an auxiliary beam pivotally connected to said scale beam and attached at one end to said platform connection, a spring arranged to resist movement of said auxiliary beam, a balance weight for said auxiliary beam, a main dial having an indicator hand operatively connected with said beam, a secondary dial graduated to represent fractions of the graduations of said main dial, an indicator hand for said secondary dial, a finger grip geared to said secondary dial indicator hand, and a sliding rack bar meshing with said finger grip gear and operatively connected with said balance weight, substantially as described.

6. A scale comprising a scale beam having a poise weight and platform connection, a lever casing having a pivotal connection at one end with said beam, means supporting the other end of said lever casing, an auxiliary beam pivoted on said lever casing and attached at one end to said scale platform connection, said auxiliary beam being movable independently of said scale beam, means yieldingly resisting the movement of said auxiliary beam, and weight indicating means operatively connected with said auxiliary beam and constructed to permit the operator to ascertain at a glance the weight of the object on said scale platform without balancing said scale beam.

7. A scale comprising a scale beam, a platform connection, a lever casing pivotally connected at one end with said beam and means supporting the other end of said casing, an auxiliary beam pivotally supported in said casing and connected to said platform connection, means yieldingly resisting the movement of said auxiliary beam, a graduated dial, and an indicator hand arranged to move over the graduations of said dial and operatively connected with said auxiliary beam, whereby the operator without balancing said scale beam can ascertain at a glance the weight of the object on the scale platform.

8. A scale comprising a scale beam and platform connection, an auxiliary beam pivotally connected with said scale beam and attached to said scale platform connection, means for yieldingly resisting the movement of said auxiliary beam, a balance weight for said auxiliary beam, mechanism for moving said balance weight, and weight indicating means operatively connected with said auxiliary beam.

9. A scale comprising a scale beam and platform connection, a lever casing having a pivotal connection with said beam, an auxiliary beam projecting into said casing and pivotally supported thereon and attached to said platform connection, means yieldingly resisting the movement of said auxiliary beam, a balance weight for said auxiliary beam, mechanism for adjusting said balance weight, and weight indicating means operatively connected with said auxiliary beam.

10. A scale comprising a scale beam and platform connection, a lever casing pivotally connected with said beam, an auxiliary beam pivoted on said lever casing and movable independently of said scale beam and attached at one end to said platform connection, means for yieldingly resisting movement of said auxiliary beam, and weight indicating means operatively connected with said auxiliary beam, a casing inclosing said auxiliary beam and carried by said lever casing, and a stationary support for said casing and lever casing.

11. A scale comprising a weighing beam and a poise, a stop for the beam under load, a lever connected to the short arm of said beam, a second lever pivotally connected with said first named lever, means connected to said second lever for connection with a load support, means yieldingly resisting relative movement of said levers, and a weight indicator operatively connected with one of said levers.

12. A weighing scale comprising a pivotally supported lever, a beam or second lever pivotally supported on said first named lever, the short arm of said second lever having means for connection with a platform or load support, means yieldingly resisting relative movement of said levers, a dial and indicator hand carried by one of said levers, and means operatively connecting said indicator hand with the other lever.

13. A spring scale comprising a pivoted lever, a second lever pivotally supported on said first named lever, the short arm of said second lever having means for connection with a load support, a spring interposed between the long arms of said levers and resisting relative movement thereof, and a weight indicator carried by the long arm of one lever and operatively connected with the corresponding arm of the other lever.

14. In a platform scale, the combination, with a poise controlled weighing beam, a lever suspended thereon, a second lever pivoted on said first named lever, means connecting the short arm of said second lever with platform levers, a spring interposed between the long arms of said levers and resisting relative movement thereof, a dial and indicator hand carried by the long arm of one of said levers, and means operatively connecting said indicator hand with the corresponding arm of the other lever.

15. In a scale, a weighing beam, a stop for said beam under load, a poise on said beam between its pivot and said stop, a beam-rod section, a weighing mechanism interposed between said rod and said beam, said weighing mechanism including a lever mechanism and a graduated scale and pointer operating to indicate the weight of the load on said support independently of said beam.

16. In a platform scale, the combination, of a beam-rod in two sections, levers substantially horizontally connected respectively at their corresponding ends to said sections and pivoted upon one another near said ends, a spring between said levers and means for indicating the movement of the levers upon each other proportionate to the load on the scale.

17. In a scale, a weighing beam, a stop for said beam under load, a poise on said beam between said stop and the pivot of said beam, a beam-rod in two sections, levers having their corresponding ends connected respectively with said sections, a spring interposed between said levers, a pointer and graduated dial for indicating the load on the scale, and means operatively connecting one of said levers with said pointer.

18. In a platform scale, the combination, with a weighing beam and a beam-rod in two sections for connection with the load support, of two substantially horizontal levers having their corresponding ends connected respectively to the said two sections and hinged together, a spring interposed between said levers, a rack bar on one lever and a pinion on the other lever, with which pinion the rack bar engages, and indicating means actuated by said pinion.

19. A scale comprising a weighing beam, a stop for said beam under load, a poise on said beam between its pivot and said stop, a beam-rod, a weighing mechanism, including relatively movable levers connected with said rod, means resisting relative movement of said levers, and a graduated scale and pointer operating to indicate the weight load on said support independently of said beam.

20. A scale comprising a weighing beam and a poise therefor, a lever connected to the short arm of said beam, a second lever pivotally connected to said first named lever, means attached to said second lever for connection with a load support, a variable counterpoising means, including a dash-pot device interposed between the long arms of said levers and resisting relative movement thereof, and a weight indicator operatively connected with one of said levers.

21. In a platform scale, the combination with a weighing beam and poise, of a beam-rod in two sections for said beam, levers connected to each section and pivoted together near the corresponding adjacent ends, a variable counter-poising means including a dash-pot interposed between the long arms of said levers and means for indicating the movement of the levers upon each other.

22. A weighing scale comprising a scale beam, a lever pivotally supported thereby, a second lever supported on said first named lever and having means for connection with a platform or load support, a variable counter-poising means, including a cylinder and piston connected respectively with said levers and yieldingly resisting relative movement thereof, and a weight indicating mechanism operatively connected with said levers.

23. The combination, with a weighing beam and a poise, of a beam-rod in two sections, with one section connected to said beam, levers connected to each section and pivoted together, a variable counter-poising means including a dash-pot device having its members connected respectively with said levers, and means for indicating the movement of said levers upon each other proportionately to the load on the scale.

24. In a scale, the combination, with a poise-controlled weighing beam and a stop therefor, of a beam-rod in two sections with one section connected to said beam, levers connected to each section and pivoted together near their corresponding adjacent ends, a variable counter-poising means interposed between the long arms of said levers, and means for indicating the movement of the levers upon each other.

25. In a scale, the combination, with a poise-controlled weighing beam and a stop therefor, of a beam-rod in two sections with one section connected to said beam, levers connected to each section and pivoted together near their corresponding adjacent ends, a variable counter-poising means having its members connected respectively to said levers and alone resisting relative movement of said levers, and means for indicating the movement of said levers with respect to one another proportionately to the load on the scale.

26. A scale comprising a poise-controlled weighing beam, a stop for said beam under load and a beam-rod, a weighing mechanism, including levers pivoted together near their corresponding adjacent ends and connected with said rod and with said beam, means resisting relative movement of said levers, and means for indicating the movement of said levers upon each other proportionate to the load on the scale.

27. In a scale, the combination, with a weighing beam and a beam-rod, of levers pivoted upon one another and having pivotal connections with said rod and with said beam, a variable counter-poising means interposed between the long arms of said levers and means for indicating the movement of the said levers upon one another.

28. In a scale, the combination, with a scale beam, of a beam-rod in sections, levers connected to said sections respectively and pivoted upon one another, a counter-poising means interposed between said levers, and means for indicating the movement of the levers upon one another.

29. In a scale, the combination, with a scale beam, a poise therefor and a beam-rod, a casing having a pivotal connection with said beam, a dial and indicator hand supported by said casing, a second beam pivotally supported by said casing, and connected with said beam-rod and with said indicator hand, and a counter-poising means for said second beam.

30. A weighing scale comprising a scale beam and poise and a beam-rod, levers connected with said rod and with said beam and pivotally connected to one another, means for indicating relative movement of said levers, and a variable means opposing such relative movement.

In witness whereof, I have hereunto set my hand this 3d day of October, 1910.

ROBERT McFARLANE.

Witnesses:
GENEVIEVE E. SORENSEN,
ALICE GOLDEN.

Copies of this patent may be obtained for five cents each, by addressing the "Commissioner of Patents, Washington, D. C."